US012514783B2

(12) United States Patent
Huber et al.

(10) Patent No.: US 12,514,783 B2
(45) Date of Patent: Jan. 6, 2026

(54) BLISTER PACKAGING FOR PHARMACEUTICALS

(71) Applicant: Pfizer Inc., New York, NY (US)

(72) Inventors: Thomas Huber, New York, NY (US); Hetal Naik, New York, NY (US)

(73) Assignee: PFIZER INC., New York, NY (US)

( * ) Notice: Subject to any disclaimer, the term of this patent is extended or adjusted under 35 U.S.C. 154(b) by 0 days.

(21) Appl. No.: 18/717,689

(22) PCT Filed: Dec. 16, 2022

(86) PCT No.: PCT/US2022/081725
§ 371 (c)(1),
(2) Date: Jun. 7, 2024

(87) PCT Pub. No.: WO2023/122487
PCT Pub. Date: Jun. 29, 2023

(65) Prior Publication Data

US 2025/0041159 A1 Feb. 6, 2025

Related U.S. Application Data

(60) Provisional application No. 63/291,873, filed on Dec. 20, 2021.

(51) Int. Cl.
*A61J 1/03* (2023.01)
*B65D 75/36* (2006.01)

(52) U.S. Cl.
CPC ............ *A61J 1/035* (2013.01); *B65D 75/367* (2013.01); *A61J 2205/30* (2013.01)

(58) Field of Classification Search
CPC .......... A61J 1/035; A61J 2205/30; A61J 1/03; B65D 75/367; B65D 75/327; B65D 75/323
(Continued)

(56) References Cited

U.S. PATENT DOCUMENTS 6,375,956 B1 4/2002 Hermelin et al.
D689,373 S * 9/2013 Logue ............................ D9/732
(Continued)

FOREIGN PATENT DOCUMENTS

WO 2020/190911 9/2020
WO 2021/142068 7/2021

OTHER PUBLICATIONS

International Search Report and Written Opinion for International Application No. PCT/US2022/081725, mailed Mar. 31, 2023, 7 pages.

*Primary Examiner* — Steven A. Reynolds
(74) *Attorney, Agent, or Firm* — DLA Piper LLP (US)

(57) ABSTRACT

A blister package is disclosed herein. The blister package includes a body, a plurality of pockets, and a top seal. The body has a top surface and a bottom surface opposite the top surface. The plurality of pockets is formed in the body. Each of the plurality of pockets extend below the top surface of the body. Each pocket of the plurality of pockets is configured to hold a pharmaceutical. The plurality of pockets is arranged in a manner that defines at least one dose. The plurality of pockets for the at least one dose includes a first pocket in parallel with a second pocket, and a third pocket perpendicular to the first pocket and the second pocket. The top seal is configured to interface with the body. The top seal is configured to hold the pharmaceutical in each respective pocket.

9 Claims, 5 Drawing Sheets

(58) Field of Classification Search
USPC .................................. 206/531, 534, 538, 528
See application file for complete search history.

(56) References Cited

U.S. PATENT DOCUMENTS

| | | | | |
|---|---|---|---|---|
| 8,752,704 | B2 * | 6/2014 | Leon Alonso ....... | B65D 75/327 206/532 |
| 2008/0128450 | A1 | 6/2008 | O'Gorman et al. | |
| 2012/0152796 | A1 | 6/2012 | Leon Alonso et al. | |
| 2016/0367436 | A1 * | 12/2016 | Upchurch ............ | B65D 75/367 |
| 2022/0024663 | A1 * | 1/2022 | Priscal ................. | A61K 31/352 |

* cited by examiner

BLISTER PACKAGING FOR PHARMACEUTICALS

CROSS-REFERENCE TO RELATED APPLICATIONS

This application claims priority to U.S. Provisional Application Ser. No. 63/291,873, filed Dec. 20, 2021, which is hereby incorporated by reference in its entirety.

FIELD OF THE DISCLOSURE

The present disclosure generally relates to packaging for pharmaceuticals and, more specifically, blister packaging for pharmaceuticals.

BACKGROUND

Pharmaceutical packaging is an important aspect of delivering pharmaceuticals in an easy to dispense manner. Pharmaceutical packaging is important to the overall product in terms of protecting the pharmaceutical, as well as providing the user with an easy way to identify the correct dose.

SUMMARY

In some embodiments, a blister package is disclosed herein. The blister package includes a body, a plurality of pockets, and a top seal. The body has a top surface and a bottom surface opposite the top surface. The plurality of pockets is formed in the body. Each of the plurality of pockets extend below the top surface of the body. Each pocket of the plurality of pockets is configured to hold a pharmaceutical. The plurality of pockets is arranged in a manner that defines at least one dose. The plurality of pockets for the at least one dose includes a first pocket in parallel with a second pocket, and a third pocket perpendicular to the first pocket and the second pocket. The top seal is configured to interface with the body. The top seal is configured to hold the pharmaceutical in each respective pocket.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein generally relate to a blister package for pharmaceuticals. The blister package may be configured to include multiple doses of a pharmaceutical. For example, the blister package described herein may be configured to include multiple dosages of a COVID-19 Oral Anti-Viral pharmaceutical. Each dose may include multiple tablets associated therewith. For example, each does may include two tablets of a first pharmaceutical and one tablet of a second pharmaceutical.

Figure 1:
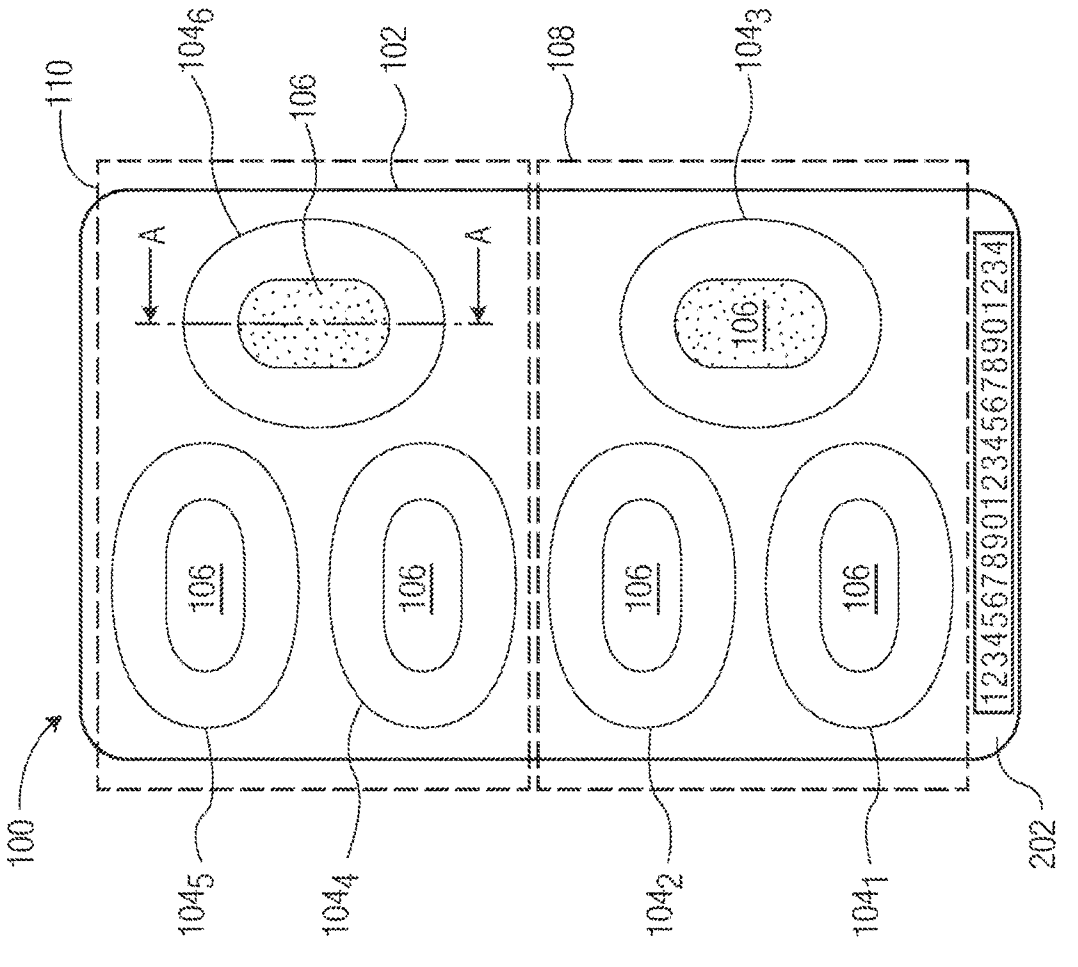
FIG. 1 is a top diagram illustrating a blister package, according to example embodiments.

FIG. 1 is a top diagram illustrates a blister package 100, according to example embodiments. Blister package 100 may be configured to hold or store pharmaceuticals. As shown, blister package 100 may include a body 102 having a plurality of pockets 104 formed therein. Each pocket 104 of the plurality of pockets may be configured to store or hold a pharmaceutical 106, such as, but not limited to a capsule.

As shown, plurality of pockets 104 may be arranged in a manner that defines a dose for an individual to consume. For example, although representative, blister package 100 may be configured to include a first dose 108 and a second dose 110. Each pocket 104 may be arranged to hold a specific pharmaceutical for each of first dose 108 and second dose 110. For example, as show, plurality of pockets 104 may include six pockets, pocket 1041-$\mathbf{104}_6$. Pockets 1041-1043 may correspond to first dose 108; pockets $\mathbf{104}_4$-$\mathbf{104}_6$ may correspond to second dose 110.

In some embodiments, the arrangement of pockets 104 may assist the consumer in easily identifying each dose 108 and 110, as well as the pharmaceuticals corresponding to each dose 108 and 110. For example, pocket 1041 and pocket $\mathbf{104}_2$ may be arranged in parallel. In some embodiments, the pharmaceutical disposed in pocket 1041 may be the same pharmaceutical disposed in pocket $\mathbf{104}_2$. Pocket 1043 may be perpendicular to pocket 1041 and pocket $\mathbf{104}_2$. Pocket 1043 may be a different pharmaceutical than the pharmaceutical disposed in pocket 1041 and pocket $\mathbf{104}_2$. Similarly, for second dose 110, pocket $\mathbf{104}_4$ and pocket $\mathbf{104}_5$ may be arranged in parallel. In some embodiments, the pharmaceutical disposed in pocket $\mathbf{104}_4$ may be the same pharmaceutical disposed in pocket $\mathbf{104}_5$. Pocket $\mathbf{104}_6$ may be perpendicular to pocket $\mathbf{104}_4$ and pocket $\mathbf{104}_5$. Pocket $\mathbf{104}_6$ may store a different pharmaceutical than the pharmaceutical disposed in pocket $\mathbf{104}_4$ and pocket $\mathbf{104}_5$.

Figure 2:
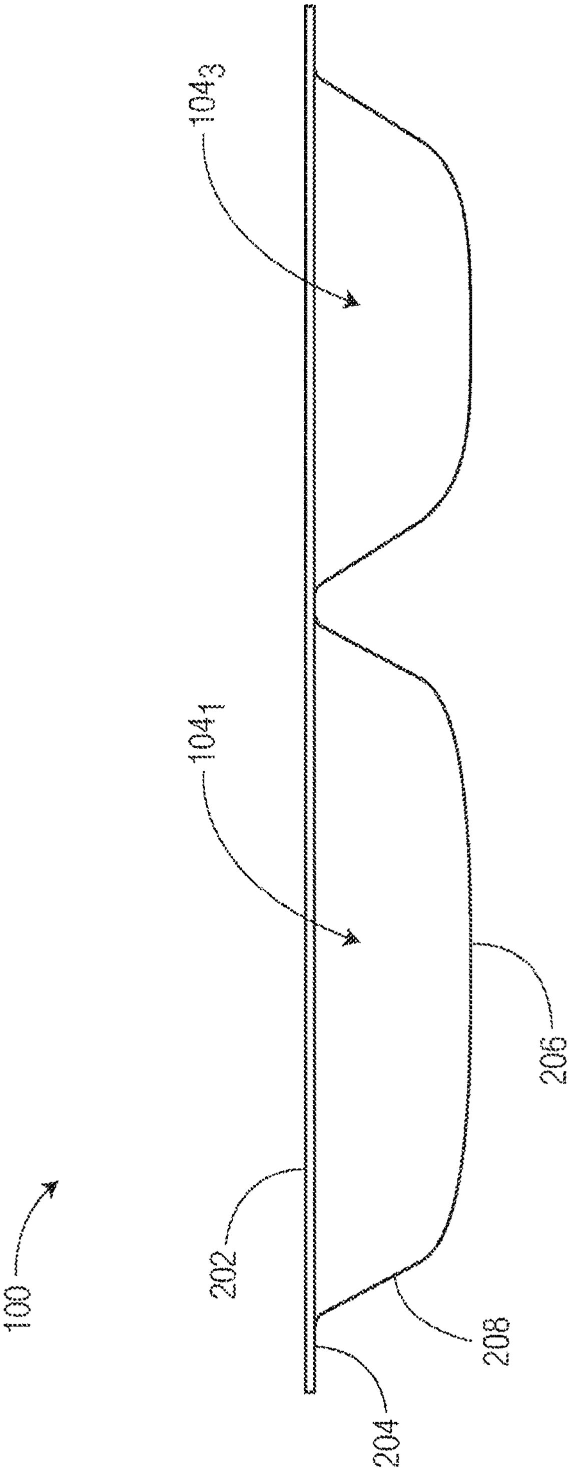
FIG. 2 is a side view of the blister package of FIG. 1, according to example embodiments.

FIG. 2 is a side view of blister package 100, according to example embodiments. As shown, body 102 may include a top surface 202 and a bottom surface 204 opposite top surface 202. Pocket 104 may be formed in top surface 202 of blister package 100. Pocket 104 may be formed in top surface 202 in such a way that pocket 104 is integral with body 102. For example, pocket 104 may include a bottom surface 206 that extends below bottom surface 204. Pocket 104 may include side walls 208 that slope downwards from top surface 202 to bottom surface 206 in a manner that defines pocket 104 in body 102.

In some embodiments, blister package 100 may be thermoformed. In such techniques, each pocket 104 may be formed in body 102 during the thermoforming process.

Figure 3:
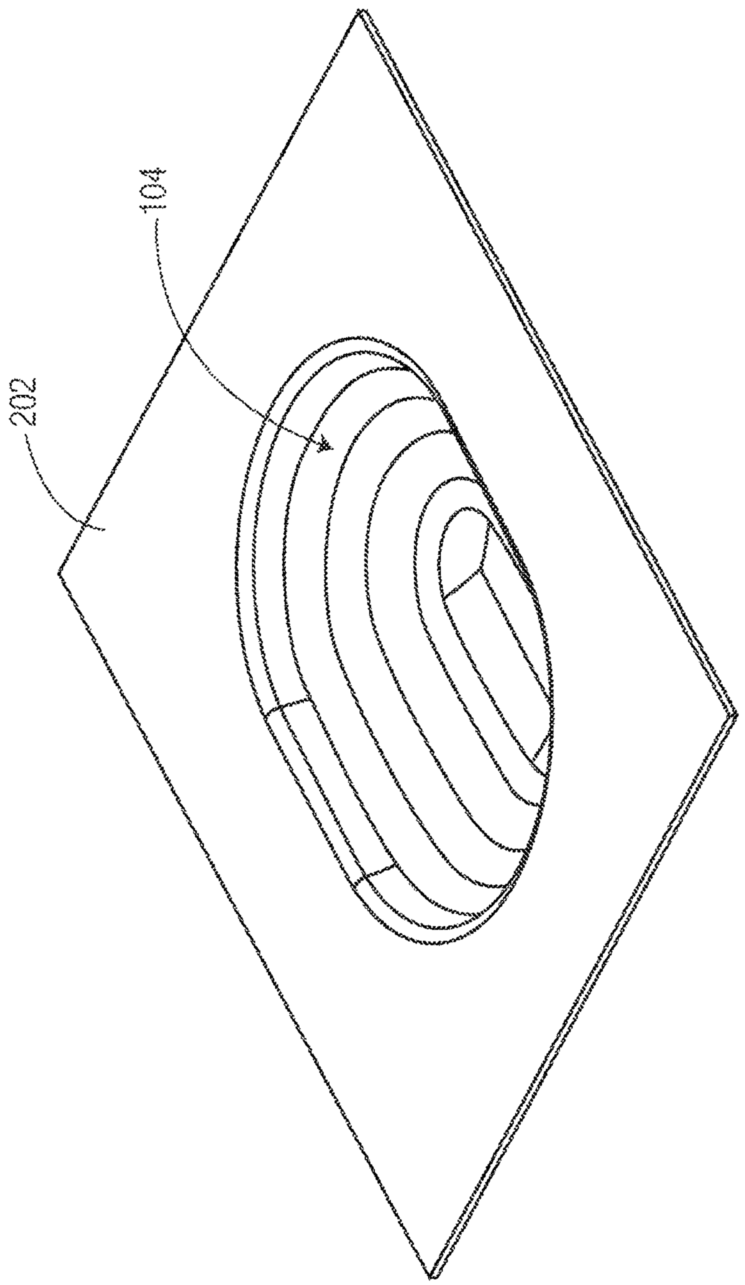
FIG. 3 is a perspective view of a single pocket of the blister package of FIG. 1, according to example embodiments.

FIG. 3 is a perspective view of a single pocket 104, according to example embodiments. As shown, pocket 104 may be arranged in a telescoping manner. For example, side walls 208 of pocket 104 may slope in a downwards manner from top surface 202 to bottom surface 206. The telescoping design assists users in dispensing the pharmaceutical contained therein. For example, in operation, a user would push bottom surface 206 of pocket 104 to expel pharmaceutical 106 from blister package 100. The telescoping design provides the user with an easier to expel pharmaceutical 106 from pocket 104.

Figure 4:
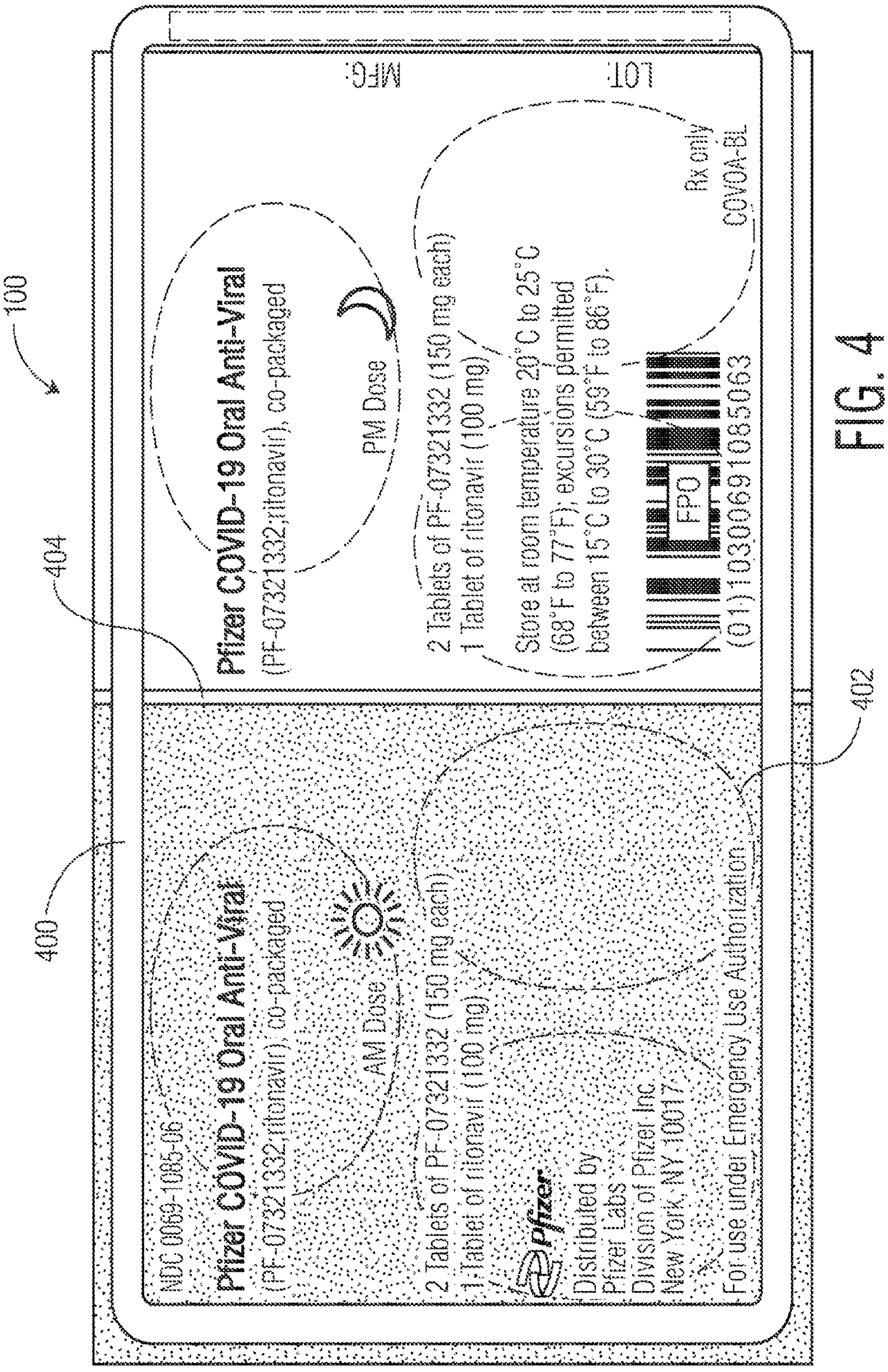
FIG. 4 is a top view of the blister package of FIG. 1 with a top seal in place, according to example embodiments.

FIG. 4 illustrates blister package 100 with a top seal 400, according to example embodiments. As shown, top seal 400 may be applied to blister package 100 to hold pharmaceuticals 106 in place. Top seal 400 may be configured to interface with top surface 202 of blister package 100. In some embodiments, top seal 400 may be heat sealed to top surface 202. In some embodiments, top seal 400 may be cold sealed to top surface 202. In this manner, top seal 400 may be configured to retain pharmaceuticals 106 in each respective pocket 104.

In some embodiments, because top seal 400 interfaces with top surface 202 of blister package 100, the interfacing of top seal 400 with top surface 202 may result in a visual indication of the location of each pocket 104. For example, as shown, when top seal 400 is in place, an outline 402 of each pocket 104 may be formed. Outline 402 may help the user identify the location of each pharmaceutical in blister package 100.

In some embodiments, top seal 400 may include a visual indicator 404 that separates multiple doses in the same blister package 100. For example, as shown, visual indicator 404 may separate first dose 108 from second dose 110. In this manner, a user may be able to easily identify those pharmaceuticals associated with each respective dose.

Top seal 400 may be formed from a material that allows each pharmaceutical 106 to break through. For example, in operation, a user may apply a force to bottom surface 206 of pocket 104 to cause pharmaceutical 106 to break through top seal 400. For example, top seal 400 may be formed from one or more of aluminum, paper, plastic, and the like.

In some embodiments, top seal 400 may be configured to include information regarding the pharmaceutical contained in blister package 100. For example, as shown, top seal 400 may include information regarding the pharmaceutical, as well as visual indicators (e.g., colors) denoting each dose.

Figure 5:
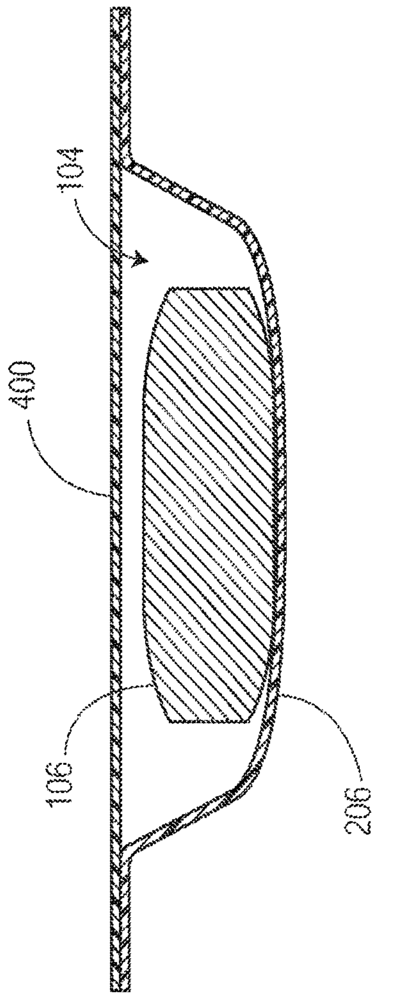
FIG. 5 is a partial cross sectional view of the blister package of FIG. 1 with top seal in place, according to example embodiments.

FIG. 5 is a side view illustrating a partial cross sectional view of blister package 100 with top seal 400, according to example embodiments. As shown, top seal 400 may be sealed to top surface 202 of body 102. Top seal 400 may substantially cover an opening defined by pocket 104.

As shown, each pocket 104 may be formed substantially larger than the size of pharmaceutical 106 disposed therein. For example, pharmaceutical 106 may be disposed in pocket 104 in a manner that allows for partial movement of pharmaceutical 106 in pocket 104. For example, pocket 104 may include a depth such that there may be a space between pharmaceutical 106 and top seal 400.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A blister packaging, comprising:

a body having a top surface and a bottom surface opposite the top surface;

a first plurality of pockets formed in the body holding a first dose, wherein each of the first plurality of pockets extend below the top surface of the body, and each pocket of the plurality of pockets holds a pharmaceutical, wherein the first plurality of pockets is arranged in a manner that defines the first dose, wherein the first plurality of pockets holding the first dose comprises a first pocket in parallel with a second pocket, and a third pocket perpendicular to the first pocket and the second pocket;

a second plurality of pockets formed in the body holding a second dose, wherein each of the second plurality of pockets extend below the top surface of the body, and each pocket of the second plurality of pockets holds the pharmaceutical, wherein the second plurality of pockets is arranged in a manner that defines the second dose, wherein the second plurality of pockets holding the second dose comprises a fourth pocket in parallel with a fifth pocket, and a sixth pocket perpendicular to the fourth pocket and the fifth pocket; and a top seal configured to interface with the body, wherein the top seal is configured to hold the pharmaceutical in each respective pocket.

2. The blister packaging of claim 1, wherein the top seal comprises a visual indicator that separates the at least one dose from the at least one second dose.

3. The blister packaging of claim 1, wherein the pharmaceutical positioned in any of the plurality of pockets is removable through the top seal.

4. The blister packaging of claim 1, wherein the top seal is cold sealed to the top surface of the body.

5. The blister packaging of claim 1, wherein the top seal is heat sealed to the top surface of the body.

6. The blister packaging of claim 1, wherein the top seal comprises a plurality of markings, wherein each marking of the plurality of markings denotes a location of the pharmaceutical under the top seal.

7. The blister packaging of claim 1, wherein the top seal substantially covers each respective pocket.

8. The blister packaging of claim 1, wherein each pocket has a depth such that there is a gap between the pharmaceutical in each pocket and the top seal.

9. The blister packaging of claim 1, wherein each pocket comprises side walls that slope in a downwards direction.

* * * * *